United States Patent Office 3,555,931
Patented Jan. 19, 1971

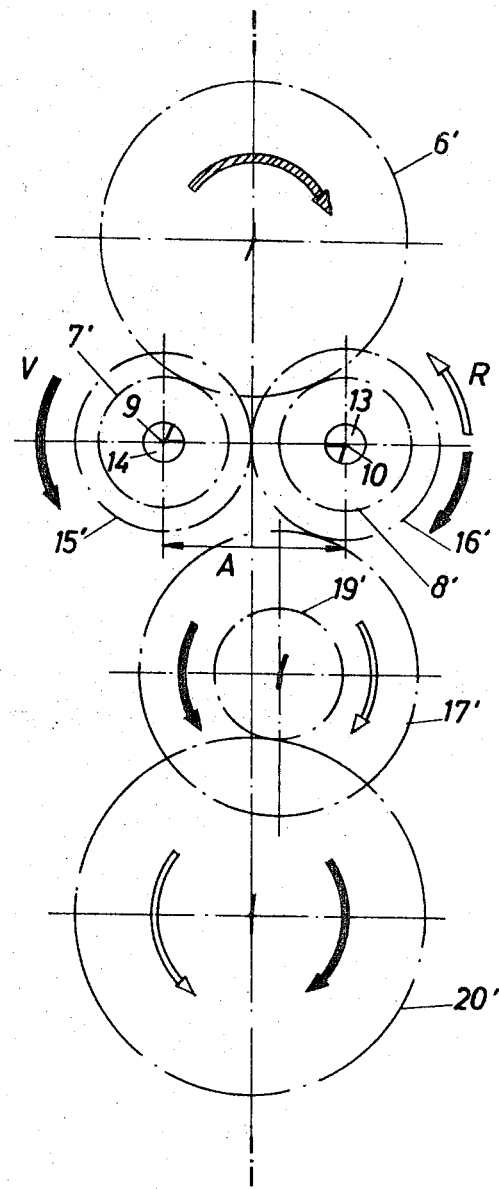

3,555,931
HYDRODYNAMIC TRANSMISSION
Erich Polzer, Heidenheim, Germany, assignor to Voith Getriebe KG, Heidenheim, Germany
Filed Oct. 14, 1968, Ser. No. 767,313
Claims priority, application Germany, Oct. 18, 1967, 1,650,888
Int. Cl. F16h 47/00
U.S. Cl. 74—718
5 Claims

ABSTRACT OF THE DISCLOSURE

A transmission with at least one pair of converters, in which the converters of each pair are offset with regard to each other in axial direction by at least the axial structural length of one converter and are in radial direction so close to each other that when viewed in axial direction the converters overlap each other, the converters of each pair of converters having a unitary common self-supporting housing in which the blades, bearings, and other pertaining parts are mounted.

---

Figure 1:
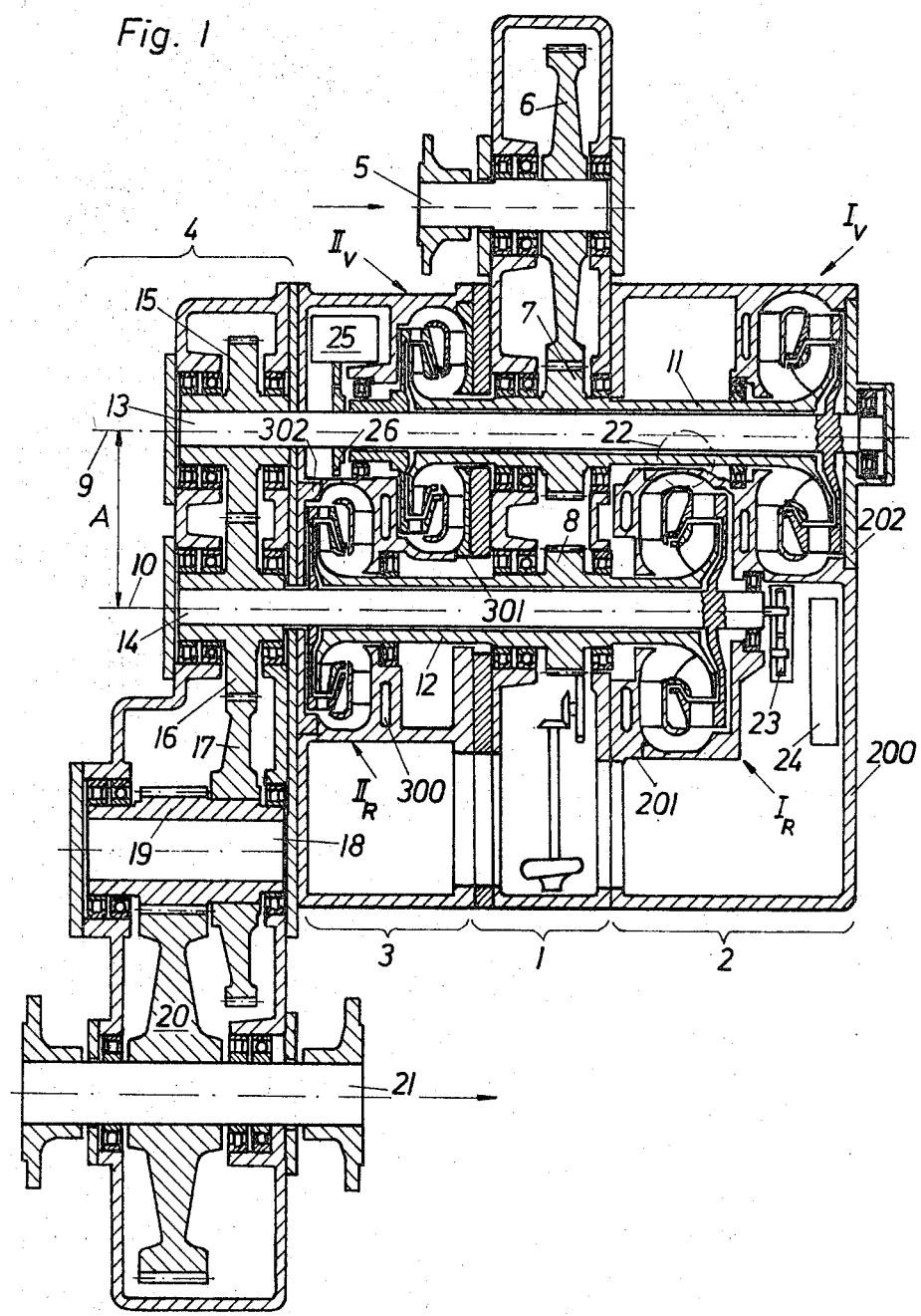

The present invention relates to a hydrodynamic transmission with at least two fluid flow circuits, especially torque converters, with preferably speed increasing mechanical transmission means on the primary side and with preferably speed reducing transmission means on the secondary side of the fluid flow circuits.

In transmissions of the above mentioned type, the power path extends from the driving motor through gears to the two converters and past said converters to the output while being united to the output shaft if only one output shaft is provided. If a hydrodynamic reversible transmission is involved, there is interposed between the merging area and one of the converters a pinion for reversing the direction of rotation. This means that in a control position two converters on the input side are through a spur gear chain of an odd numer of gears and on the output side through a spur gear chain of an even number of gears connected to each other.

Transmissions of this type are built into vehicles which frequently require a change in the driving direction, such as switch engines. The power flow can during the reversing operation be effected without interrupting the pulling force and in a wear-free manner from forward drive to rearward drive by changing the filling of the converters. The arrangement of two converters so that their axes are parallel to each other has proved favorable, particularly when multivelocity transmissions are involved.

These transmissions, however, have the drawback that they are too wide. With locomotives having a frame between the discs of the wheel set, the remaining passage through the frame for the transmission is even with wide gauge locomotives insufficient. Therefore, the transmission has to be installed above the frame. A narrow after-transmission which is passed through the frame bridges the distance to the axles and conveys the driving power to the universal joint shafts.

There has been previously described and disclosed a transmission of the above mentioned type according to which the converters are offset with regard to each other in axial direction by more than the axial height of the converter, and the two axes of the converters are arranged closer to each other. While in this way the hydrodynamic transmission becomes narrower, and while the gears between the converters become smaller and consequently can be easier designed, the saving as to width is rather minor. The converter housings have their front and rear ends provided with surfaces which are coaxial to the shafts and which are adapted to be inserted into corresponding bores transversely divided by the division of the transmission housing. For purposes of preventing displacements of the axles by vibrations during the driving operations, it is necessary that all mechanical and hydrodynamic transmission elements which engage each other are journalled in a common rigid housing. This connection of the rotor housing in the transmission housing is expensive from a structural standpoint and prevents the shafts of the two converters from being materially moved closer to each other. Therefore, the above mentioned converter arrangement is in spite of an axial offsetting of the converters still requiring considerable space and is heavy since, as mentioned above, a second transmission housing has to be placed around the housing for the runners.

A further drawback of a transmission construction of the type set forth above consists in that, for instance, for the two converter or four converter arrangement there are necessary not only different guide wheel housings and runner shafts but also different transmission housings.

It is, therefore, an object of the present invention to provide a transmission of the above mentioned general type which will be greatly reduced in dimensions so as to save space.

It is another object of this invention to provide a transmission as set forth in the preceding paragraph, which will permit an easy arrangement of the converters and may in conformity with the building block system be combined in various manners with mechanical transmission units.

These and other objects and advantages of the invention will appear more clearly from the following specification in connection with the accompanying drawings, in which:

FIG. 1 diagrammatically illustrates a two-velocity range turbo reversible transmission with four converters, a step-up velocity range at the input side of the transmission and an after-transmission.

FIG. 2 shows the location of the pitch circles of the gears built into the transmission of FIG. 1.

The problem underlying the present invention has been solved by the fact that each two of the fluid flow circuits are with their axes in parallel arrangement offset in axial direction by at least one axial structural length of a circuit and are arranged so that in radial direction they overlap partially; each two fluid circuits designed in this manner comprise a unitary self-supporting housing.

By merging the runner housings of two axially offset converters with each other, a radial placement of the two fluid flow circuits toward each other will be possible to such an extent that the distance between the axes may be reduced to approximately half the diameter of the converters. Such double-wall housing forms a disc-shaped self-supporting building block unit for a hydrodynamic transmission which is separated from the remaining transmission elements by division planes extending perpendicularly with regard to the axes. The front and the rear of the housing is open and does not have to be axially divided for assembly reasons. The runner members of the two fluid flow circuits are built into the housing from the respective two sides which face away from each other. This insertion of the runner members into the housing is effected in axial direction. In view of the self-supporting compact structure of the housing, the otherwise necessary carrying transmission housing around the runner housing will become superfluous. Also additional space and weight will be saved. The gaps adjacent the offset fluid flow circuits are expediently filled by auxiliary units such as control members for the switching-on and switching-off of the converters. The control valve housings may be cast as one piece with the torque converter housing. In view of closely moving the converters toward each other, it will be possible in a hydrodynamic reversing transmission to equip the spur gear train with the even number of gears, which is necessary between the converter output shafts, while employing gears of a considerably shorter diameter than the converters. One of the two gears will convey the power to the vehicle axles. The pertaining converter serves as power transmission path, for instance, in the forward driving velocity range, whereas the other converter serves as power transmission path for the rearward velocity range. The output shaft gear of the forward converter will in the rearward drive simultaneously serve as reversing pinion. The space, the weight and the structural expenses for an otherwise necessary reversing gear will thus be saved by moving the converter shafts toward each other.

Referring now to the drawings in detail, it will be seen from FIG. 1 that the transmission is composed of four building units 1–4. The unit 1 occupying a central position comprises the mechanical step-up transmission input part with the input shaft 5, the step-up gear 6 and the two primary shaft pinions 7 and 8 as well as the pertaining bearing means. By means of this mechanical input part, the rotary movement of the drive is distributed to two parallel axes 9 and 10 and, more specifically, the input power is during the forward drive conveyed through the axis 9 while during rearward drive the power is conveyed through the axis 10. The units 2 and 3 which are adjacent to the input part comprise each two converters $I_V$ and $I_R$ and $II_V$ and $II_R$, said converters being coaxially arranged with regard to the above mentioned axes. The pump wheels of the converters I and II are interconnected through the hollow primary shaft 11, 12 while the turbine wheels are interconnected through the central secondary shafts 13, 14 extending outwardly at the same side of the hydraulic unit 3. To this side there is flanged the after-transmission unit 4 which contains the two secondary shaft gears 15 and 16 for forward and rearward drive, the output gear 17 on the counter shaft 18 and a further step-down gear stage 19, 20 with transmission output shaft 21 which gear stage bridges the space from the driving shafts.

By offsetting the two larger starting converters $I_V$ and $I_R$ by not quite the single structural length of a converter which is determined by the spacing of the antifriction bearings, it will become possible in view of the one-piece merging design of the housings of the converter to move the axes 9 and 10 of the converters toward each other to a minimum value. At that area which is indicated by the dot-dash circle 22 it will become apparent that in view of the necessary wall thickness of the primary shaft 11 and of the housing of the torque converter $I_R$, and furthermore in view of the required shaft gap it is not possible further to move the converter axes toward each other.

In view of the above mentioned short distance A of the converter axes from each other it is possible to connect the secondary shafts 13 and 14 by only two gears 15 and 16 which have a smaller diameter than the converters. Since with hydraulic reversing transmissions having converters with the same blade arrangement for the forward and rearward drive, the secondary shafts must communicate through a train with an odd number of gears, the above mentioned possibility permits a saving in the number of the necessary gears. In this connection it might be assumed that with larger distance A the gears 15 and 16 could likewise be designed larger. Such a structure, however, is prohibitive because otherwise the transmission width which is determined by the gear dimensions would still become greater than it is already in view of the adjacent converters. At a large distance A, the secondary shaft pinions are interconnected by two additional gears of which, however, one will have the function of the output gear 7. Also in this instance one gear would be made superfluous. This saved gear is represented by the reversing gear which with heretofore known transmissions is arranged at the considerable distance A between the output gear and the rearward secondary shaft gear. It will be understood that a reversing gearing in the reversing velocity range is necessary. This function is performed by the forward secondary shaft pinion. By combining two functions to one gear which is necessary anyhow, one gear will be saved. This function consolidation is brought about by electing a gear train with only two gears 15 and 16.

The gaps created by the axial offsetting adjacent the converters are filled with auxiliary units whereby a better exploitation of the space and also a saving in space will be realized. Adjacent the converters $I_R$, the starting converter for rearward drive, there are, for instance, arranged the secondary lubricating pump 23 and the control valve 24 for the filling of the converter. Adjacent the converter $II_V$, the march converter for forward drive, there is provided the shift control 25 which is driven by the gear 26 fastened to the secondary shaft 13; it serves for automatically shifting the velocity ranges.

The converter housing 200 of the two converters $I_V$ and $I_R$ and the housing 300 of the converters $II_V$ and $II_R$ are for assembly reasons provided with circular openings which have flanges and centering means through which the runners can be installed in axial direction. The openings in said housings are closed by insertable guide wheels 201, 301 and by bearing brackets 202 and 302. The primary and/or secondary shafts are divided at suitable areas for assembly reasons and are screwed together through the intervention of spur gearing.

FIG. 2 shows the pitch circles provided with the same reference numerals as the pertaining gears but additionally primed. The arrows indicate the direction of rotation of the load conveying transmission members. The shaded arrow indicates the direction of rotation of the step-up gear 6 which continuously remains the same. The black arrows indicate the direction of rotation of the transmission members under load, and the white arrows indicate the direction of rotation of the corresponding parts during rearward drive. In both instances, the power flow is conveyed through the secondary shaft gear 16. During rearward drive, the input passes directly from the rearward secondary shaft 13 through the gears 16, 17 to the output. When driving forwardly, the power is transmitted from the forward secondary shaft 14 only by a detour through the gear 16 to the output, said gear 16 serving as reversing gear during the forward drive.

FIG. 2 also shows the way in which the section is taken through the transmission of FIG. 1. It will be evident that the axes 9 and 10 of the converters are located adjacent to each other in a horizontal plane and, consequently, the distance A of these axes influences the width of the transmission.

The advantages obtained by the present invention over transmission of similar function but designed in the heretofore known manner consists in the following:

The hydrodynamic reversing transmission becomes narrower by approximately half the diameter of a converter.

By omitting a housing in a housing, the transmission becomes structurally and also from a manufacturing standpoint considerably simpler and less expensive and while becoming additionally narrower will be considerably lighter.

Furthermore, a gear and the bearing means therefor are saved which in turn makes the transmission additionally lighter and less expensive.

By keeping in stock primary and secondary shafts of different lengths, it is possible that by flanging a further disc-shaped building unit to the mechanical transmission part, a four-converter transmission can be composed in a cost-saving manner.

It is, of course, to be understood that the present invention is, by no means, limited to the specific design shown in the drawing but also comprises modifications within the scope of the appended claims.

What I claim is:

1. A hydrodynamic transmission improvement, which comprises: at least one pair of fluid flow circuits each including a stationary guide wheel as well as remaining running blade wheels journalled by shaft means defining axes of rotation respectively in an operating space, the fluid flow circuits pertaining to one and the same pair of fluid flow circuits being offset with regard to each other in axial direction by at least the axial structural length of one fluid flow circuit and partially overlapping each other in radial direction, and housing means establishing toroidal limits for said fluid flow circuits, the housing means pertaining to one and the same pair of fluid flow circuits being common thereto, the housing means for each fluid flow circuit having an access assembly opening on a face side into which the blade wheels are installed while a face side of a corresponding housing means located across from the assembly opening is closed off by a journalling cover except for a passage for the shaft means therein, the two housing means of each of two flow circuits specifically forming a pair being shifted in said axial direction with respect to each other by an axial distance corresponding to that of the operating space, the two housing means of each pair forming two stream or flow circulation courses being arranged "back-to-back" with the closed face sides toward each other and being arranged with such a spacing of the axes of rotation such that these housing means taken in said axial direction cover each other substantially halfway, the two housing means of each pair forming two fluid flow circuits in paired relationship each being embodied in a one-piece self-supporting production part except for the journalling cover belonging thereto.

2. A transmission improvement according to claim 1, in which the housing means pertaining to a pair of fluid flow circuits is axially undivided so as to form a continuous integral part in axial direction of the housing means.

3. A transmission improvement according to claim 2, in which the end faces of the housing means are provided with flanges to permit the connection thereto of additional transmission units.

4. A transmission improvement according to claim 1, in which recess means are formed by the axial offsetting of the fluid flow circuits pertaining to one and the same pair of fluid flow circuits, and which includes auxiliary devices mounted in said recess means.

5. A transmission improvement according to claim 1, which forms a hydrodynamic reversing transmission having input shaft means and output shaft means, and comprising: at least one pair of two pairs of fluid flow circuits being provided in one self-supporting housing means, two parallel-axis secondary shafts lying adjacent to each other respectively drivingly connecting a secondary member of one fluid flow circuit only of one pair of fluid flow circuits indirectly with one secondary member of one fluid flow circuit only of the other pair of fluid flow circuits in drive connection by way of input shaft means, first gear means respectively connected to each of said two secondary shafts, and second gear means meshing with the first gear means of one of said two secondary shafts only directly and being drivingly connected to said output shaft means.

References Cited

UNITED STATES PATENTS

| | | | |
|---|---|---|---|
| 2,213,349 | 9/1940 | Seibold | 74—655 |
| 2,535,904 | 12/1950 | Davis | 74—655 |
| 3,160,116 | 12/1964 | Kugel | 74—730X |
| 3,159,055 | 12/1964 | Schweizer | 74—731X |
| 3,270,587 | 9/1966 | Geray | 74—718X |

ARTHUR T. McKEON, Primary Examiner

U.S. Cl. X.R.

74—720